United States Patent [19]
Chartrand

[11] Patent Number: 6,022,036
[45] Date of Patent: Feb. 8, 2000

[54] BICYCLE APPARATUS

[75] Inventor: Armand Chartrand, Bonnyville, Canada

[73] Assignee: SA Innovatives Inc., Sherwood Park, Canada

[21] Appl. No.: 08/895,995

[22] Filed: Jul. 17, 1997

[51] Int. Cl.[7] .................................................. B62K 13/06
[52] U.S. Cl. .......................................... 280/209; 280/231
[58] Field of Search ..................................... 280/209, 230, 280/231

[56] References Cited

U.S. PATENT DOCUMENTS

| | | |
|---|---|---|
| 573,469 | 12/1896 | Keeler . |
| 603,501 | 5/1898 | Ellar . |
| 618,769 | 1/1899 | Barto . |
| 1,086,340 | 2/1914 | New .......................................... 280/209 |
| 2,694,582 | 11/1954 | Reside ...................................... 280/209 |
| 3,350,115 | 10/1967 | Ferrary . |
| 3,592,486 | 7/1971 | Fox . |
| 3,794,352 | 2/1974 | Popp ......................................... 280/209 |
| 3,836,175 | 9/1974 | Pomerance et al. ..................... 280/209 |
| 3,870,338 | 3/1975 | Holub . |
| 3,902,738 | 9/1975 | Gandrud .................................. 280/209 |
| 4,227,589 | 10/1980 | Chika ....................................... 280/209 |
| 4,288,089 | 9/1981 | Thiessen . |
| 4,740,004 | 4/1988 | McMullen . |
| 4,834,410 | 5/1989 | Parker . |
| 5,342,074 | 8/1994 | Amdahl et al. . |
| 5,511,809 | 4/1996 | Sagi ......................................... 280/209 |

FOREIGN PATENT DOCUMENTS

| | | | |
|---|---|---|---|
| 827353 | 1/1938 | France .................................... 280/209 |
| 848387 | 7/1939 | France .................................... 280/209 |
| 1736823 | 8/1990 | Russian Federation ............... 280/209 |
| 506208 | 5/1939 | United Kingdom ................... 280/209 |

*Primary Examiner*—Kevin Hurley
*Attorney, Agent, or Firm*—George A. Seaby

[57] ABSTRACT

A recreational bicycle apparatus includes side-by-side, interconnected bicycles, each of which is independently geared so that each rider can pedal at a different pace. The steering systems of the bicycles are linked so that either driver can steer using conventional handlebars. The position of comfortable, straight backed seats can be adjusted to suit the user. The apparatus is equipped with a positive trim or levelling mechanism for simultaneously changing the cant of both bicycles when riding on an inclined surface such as the sloping side of a roadway near a curb when crossing a hill. The levelling mechanism permits approximately 30° of adjustment, i.e. 15° on either side of level center.

11 Claims, 8 Drawing Sheets

BICYCLE APPARATUS

BACKGROUND OF THE INVENTION

1. Field of the Invention

This invention relates to a recreational bicycle apparatus, and in particular to an apparatus including side-by-side interconnected bicycles.

2. Discussion of the Prior Art

Dual bicycles, i.e. vehicles defined by a pair of bicycles in side-by-side relationship are by no means new. Examples of such vehicles are disclosed by U.S. Pat. Nos. 573,469, which issued to E. S. Keeler on Dec. 22, 1896; 603,501, which issued to H. Ellar on May 3, 1898; 618,769 which issued to F. Barto on Jan. 31, 1899; 3,350,115, which issued to F. F. Ferrary on Oct. 31, 1967; 3,592,486, which issued to J. M. Fox on Jul. 13, 1971; 3,870,338, which issued to F. W. Holub on Mar. 11, 1975; 4,288,089, which issued to H. F. Thiessen on Sep. 8, 1981; 4,740,004, which issued to W. M. McMullen on Apr. 26, 1988; 4,834,410, which issued to B. H. Parker on May 30, 1989 and 5,342,074, which issued to K. L. Amdahl et al on Aug. 30, 1994.

For the most part, the vehicles disclosed by the above listed patents utilize standard bicycles or standard bicycle frames. A problem with a standard bicycle is that driving such a vehicle can be decidedly uncomfortable, particularly for the elderly. Accordingly, a need exists for a comfortable recreational vehicle of the type which appeals to all age groups.

GENERAL DESCRIPTION OF THE INVENTION

An object of the present invention is provide a dual bicycle apparatus, which meets the above need, and which is relatively simple and easy to mass produce.

Another object of the invention is to provide a dual bicycle apparatus including a pair of bicycles with linked steering systems, permitting either driver of the vehicle to steer using conventional handlebars.

Yet another object of the invention is to provide a dual bicycle apparatus with a positive levelling device for simultaneously changing the cant of both bicycles when riding on an inclined surface or when going around a curve.

Accordingly, the invention relates to a bicycle apparatus comprising a first bicycle including skeletal frame means, said frame means including a front frame section supporting a front wheel and a pedal system, and a rear frame section supporting a rear wheel, the top of said rear frame section being substantially the same height as the top of said pedal system to facilitate mounting and dismounting of the apparatus; steering means on said front frame section including handlebar means connected to the front wheel for steering the apparatus; and chair means on said rear frame section, said chair means including a seat located at a level lower than said handlebar means, whereby a driver's arms are substantially horizontal when driving the apparatus.

BRIEF DESCRIPTION OF THE DRAWINGS

The invention is described below in greater detail with reference to the accompanying drawings which illustrate a preferred embodiment of the invention and wherein.

It will be noted that some elements have been deleted from various figures of the drawings in order to facilitate an understanding of the invention.

DESCRIPTION OF THE PREFERRED EMBODIMENT

Figure 1:
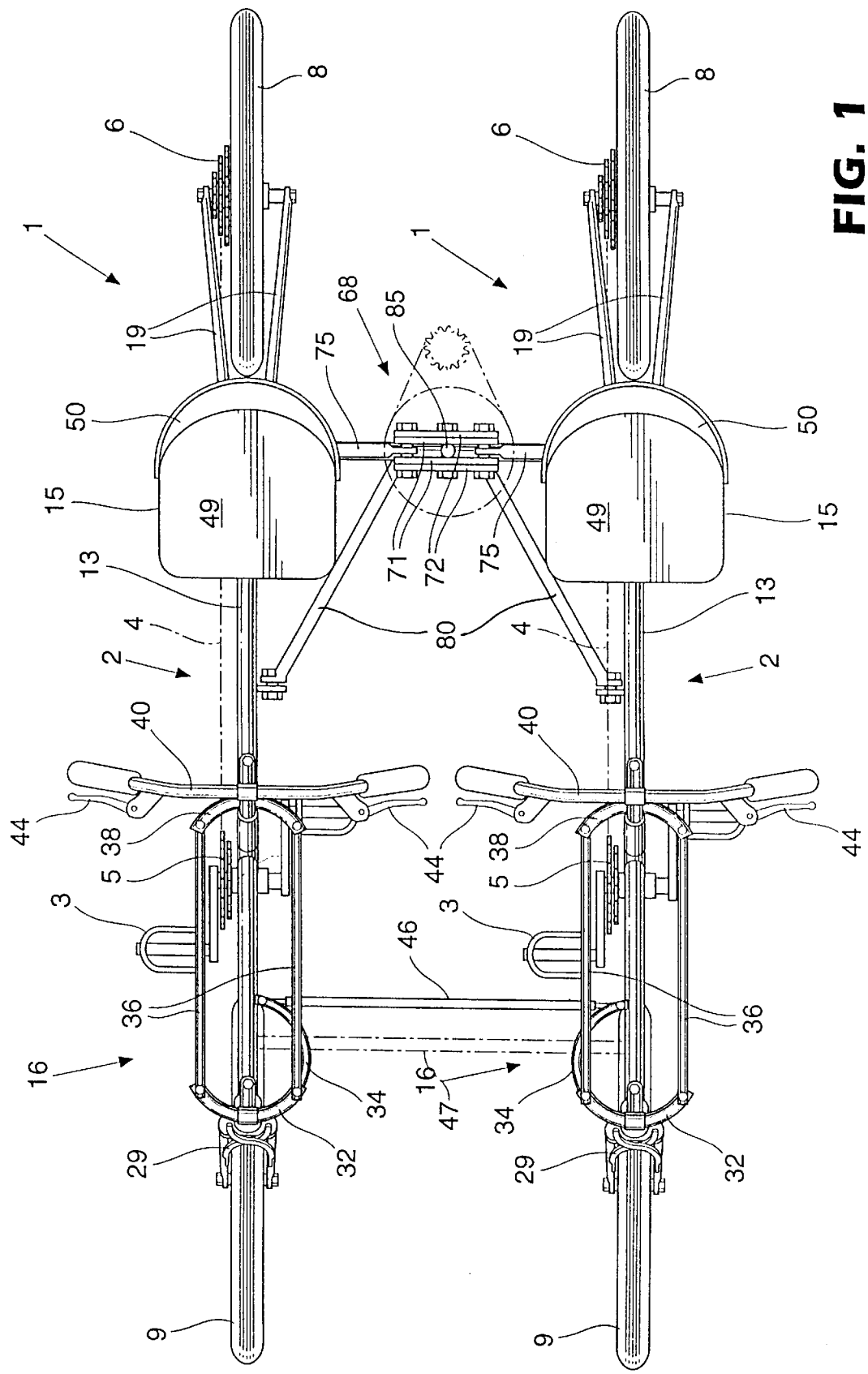
FIG. 1 is a top view of a recreational bicycle apparatus in accordance with the present invention.
Figure 2:
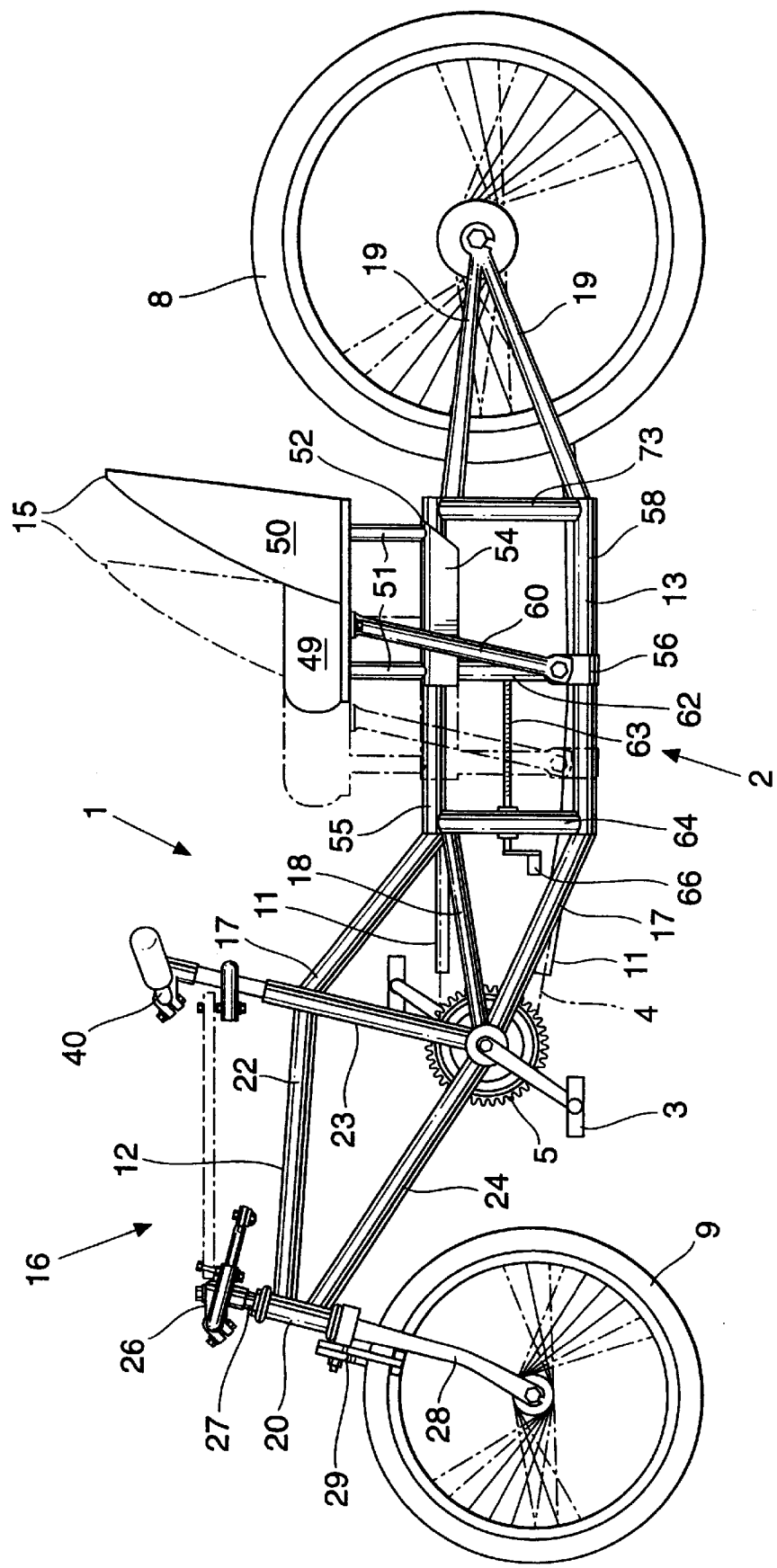
FIG. 2 is a side view of the apparatus of FIG. 1.
Figure 3:
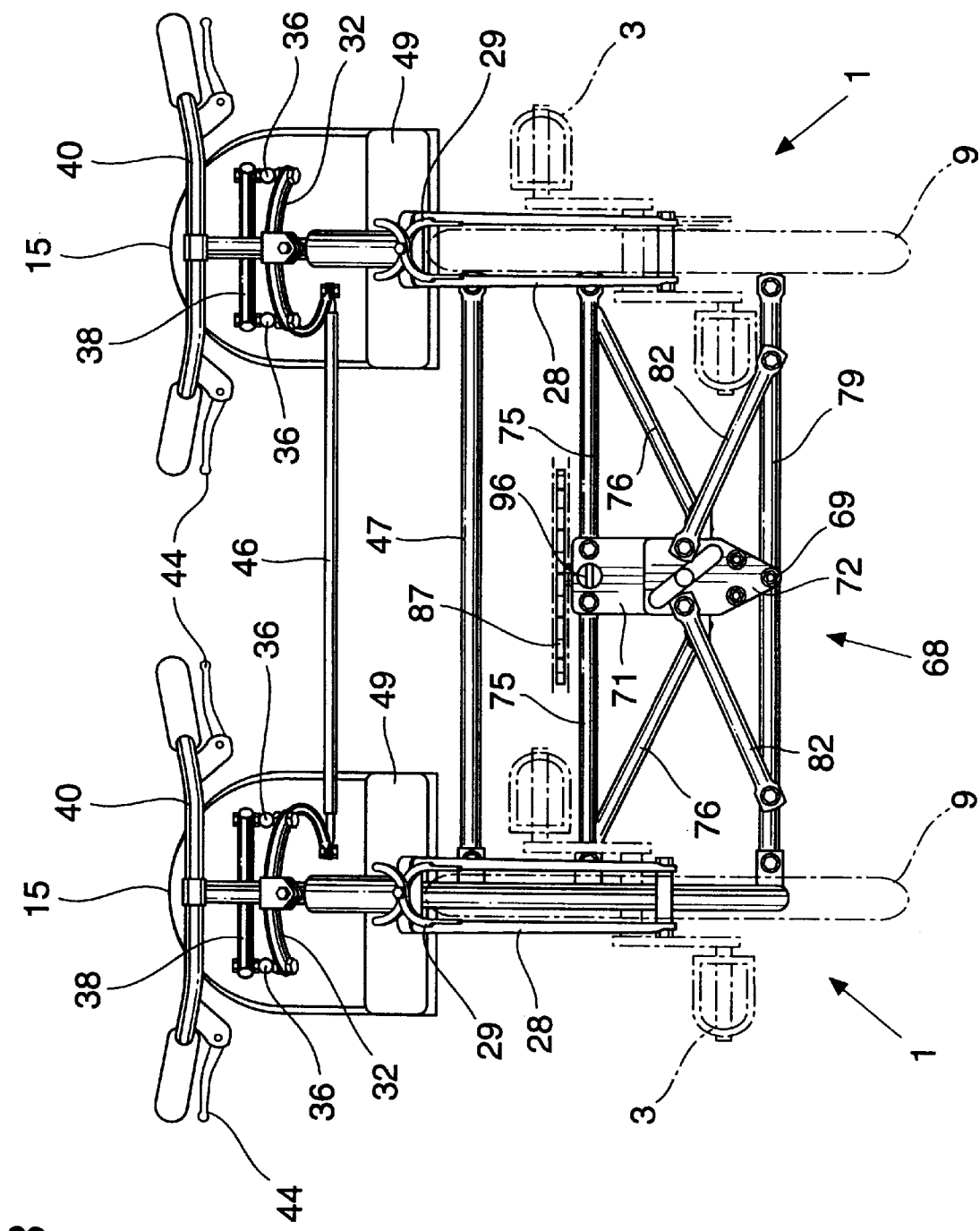
FIG. 3 is a front end view of the bicycle apparatus of FIGS. 1 and 2.

Referring to FIGS. 1 to 3, the apparatus of the present invention includes a pair of identical bicycles generally indicated at 1. Each bicycle is defined by a skeletal frame generally indicated at 2, a pedal system 3 including a chain 4 extending between sprocket 5 and a derailer gear change mechanism 6 mounted on the axle of a rear or back wheel 8, and a front wheel 9. The front wheel 9 is smaller than the back wheel 8 because the front of the bicycles carry less weight than the rear thereof, and to ensure good visibility. Tubular plastic chain guards 11 (FIG. 2) cover the endless chain 4 throughout most of its length.

Each frame 2 includes a front section 12, which resembles an ordinary bicycle frame, and a rectangular rear section 13 carrying a seat or chain 15. The front frame section 12 carries a steering system generally indicated at 16. The front section 12 is connected to the lower rear section 13 by rearwardly and downwardly inclined bars 17 and a diagonal brace 18 extending from the center of the sprocket 5 to the top, front end of the rectangular rear frame section 13. A pair of arms 19 converge rearwardly from the rear end of the rear frame section 13 for supporting the back wheel 8 and the derailer mechanism 6. The front section 12 of the frame includes a so-called head tube 20, a crossbar 22, a seat tube 23 and a down tube 24. In the case of the present invention both the head tube 20 and the seat tube 23 are used to support the steering system 16, i.e. they both perform as head tubes (in this case front and rear head tubes).

Figure 4:
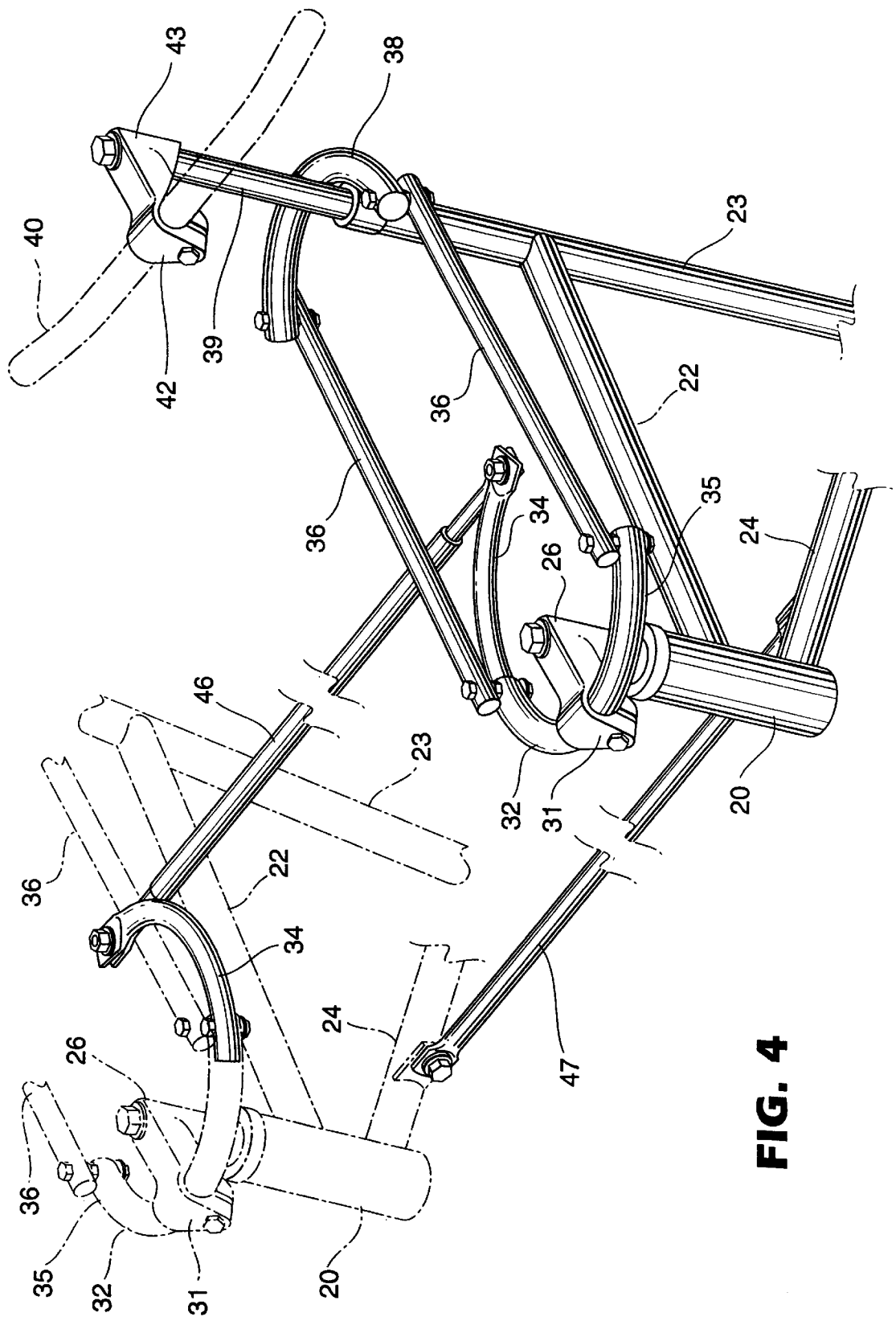
FIG. 4 is an isometric view of a portion of a steering assembly used in the apparatus of FIGS. 1 to 3.

As best shown in FIGS. 2 and 4, the steering system includes an L-shaped stem 26 mounted on a shaft 27 which is rotatably mounted in the head tube 20. The bottom end of the shaft 27 is connected to a conventional fork 28 carrying the front wheel 9. The fork 28 also carries the front brake calipers 29 of a conventional front wheel brake system.

Instead of the usual handlebars, the split top free end 31 of the stem 26 carries a generally C-shaped yoke 32, the inner arm 34 of which is longer than the outer arm 35 thereof. The front end of a drag link 36 is pivotally connected to each arm 34 and 35 of each yoke 32. The parallel drag links 36 extend rearwardly to a second generally C-shaped yoke 38. The rear ends of the links 36 are pivotally connected to the free ends of the yoke 38. The center of the yoke 38 is connected to a shaft 39 extending upwardly from and rotatably mounted in the seat or rear head tube 23. Conventional handlebars 40 are mounted in the split front end 42 of a stem 43 on the top end of the shaft 39. The handlebars 40 carry brake levers 44 (FIGS. 1 and 3) for actuating the front brake calipers 29. This assembly is used to steer one of the bicycles 1.

In order to steer both bicycles 1 in unison, the front ends of the steering system 16 and of the bicycles must be interconnected. For such purpose, a tie rod 46 extends between the free ends of the inner arms 34 of the yokes 32. The ends of the tie rod 46 are pivotally connected to the ends of the yoke arms 34, so that rotation of one yoke 32 results in corresponding movement of the other yoke 32, and consequently rotation of the front wheels 9 in unison. The front sections 12 of the frame 2 are also interconnected by a strut 47 extending between and pivotally connected to the downtube 24 rearwardly of the head tube 20.

As best shown in FIG. 2, each chair 15 is movably mounted on the rear frame section 13, so that the position of the chair relative to the handlebars 40 can be adjusted to suit the driver. The chair 15 includes a padded seat 49 and a straight back 50. Each seat 49 is mounted on posts 51 extending upwardly from a carriage 52 slidably mounted on the rear frame section 13. The carriage 52 includes an upper elongated slide 54 of inverted U-shaped cross section slidably mounted on the top bar 55 of the frame section 13, a lower slide 56 in the form of a sleeve on the bottom bar 58 of the frame section 13. The upper slide 54 is connected to the bottom of the seat 49 by the pair of posts 51, and diagonal braces 60 extend upwardly and outwardly from the sides of the lower slide 56 to the sides of the seat 49. A bar 62 extends between the slides 54 and 56 at the front end of the carriage. A threaded rod 63 rotatably mounted in the front post 64 of the rear frame section 14 is threadedly connected to the middle of the bar 62. By turning the rod 63, using a handle 66 on the front end thereof, the carriage 52 and consequently the chair 15 are caused to move longitudinally on the rear frame section 14.

As mentioned above, it is desirable to be able to cant or tilt the bicycles 1 when going around a curve or when riding across an inclined surface such as the side of a road with sloping sides. Accordingly, the apparatus of the present invention is provided with a levelling assembly, which is generally indicated at 68 in FIGS. 1 and 3.

Figure 5:
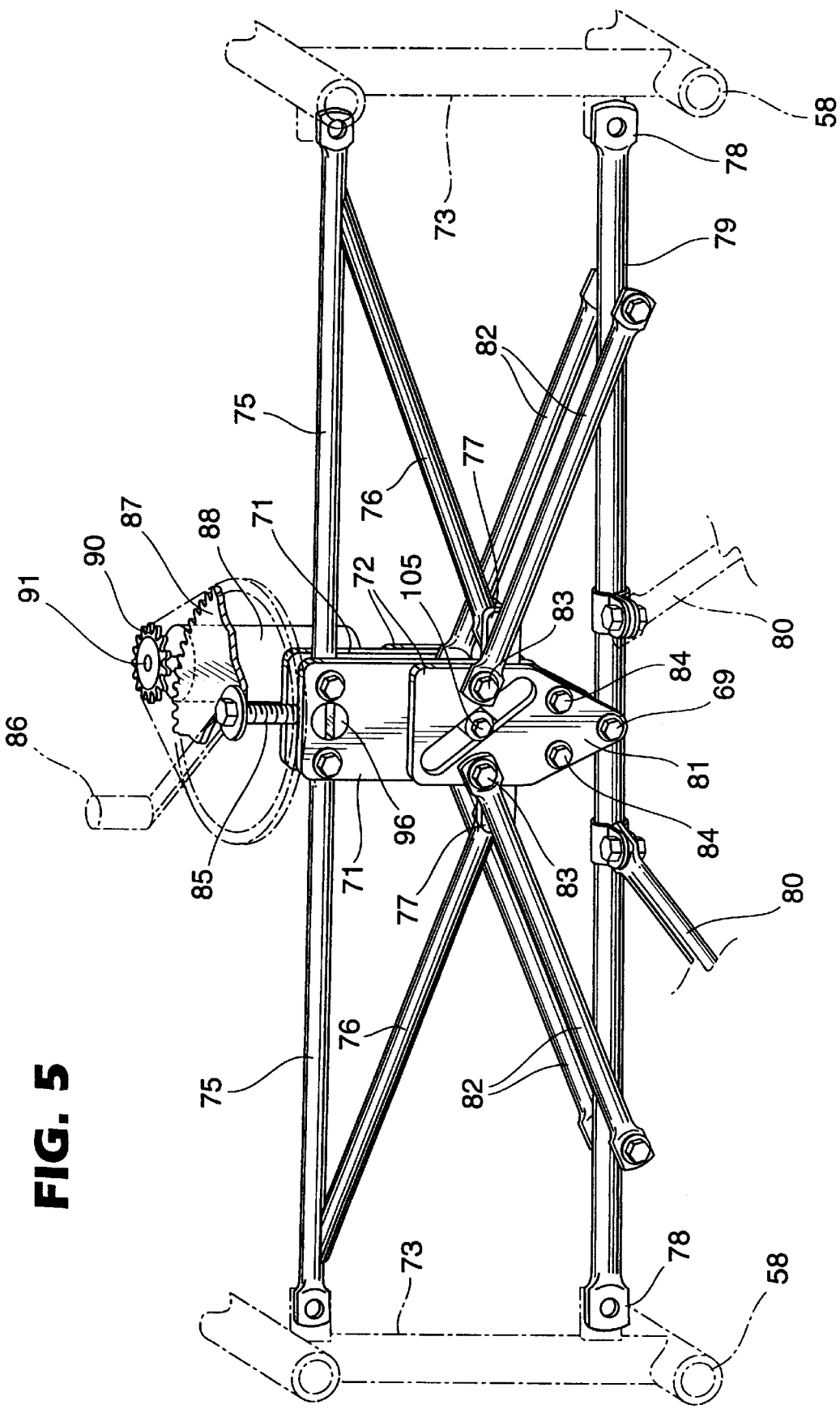
FIG. 5 is an isometric view of a levelling mechanism used in the apparatus of FIGS. 1 to 3.
Figure 6:
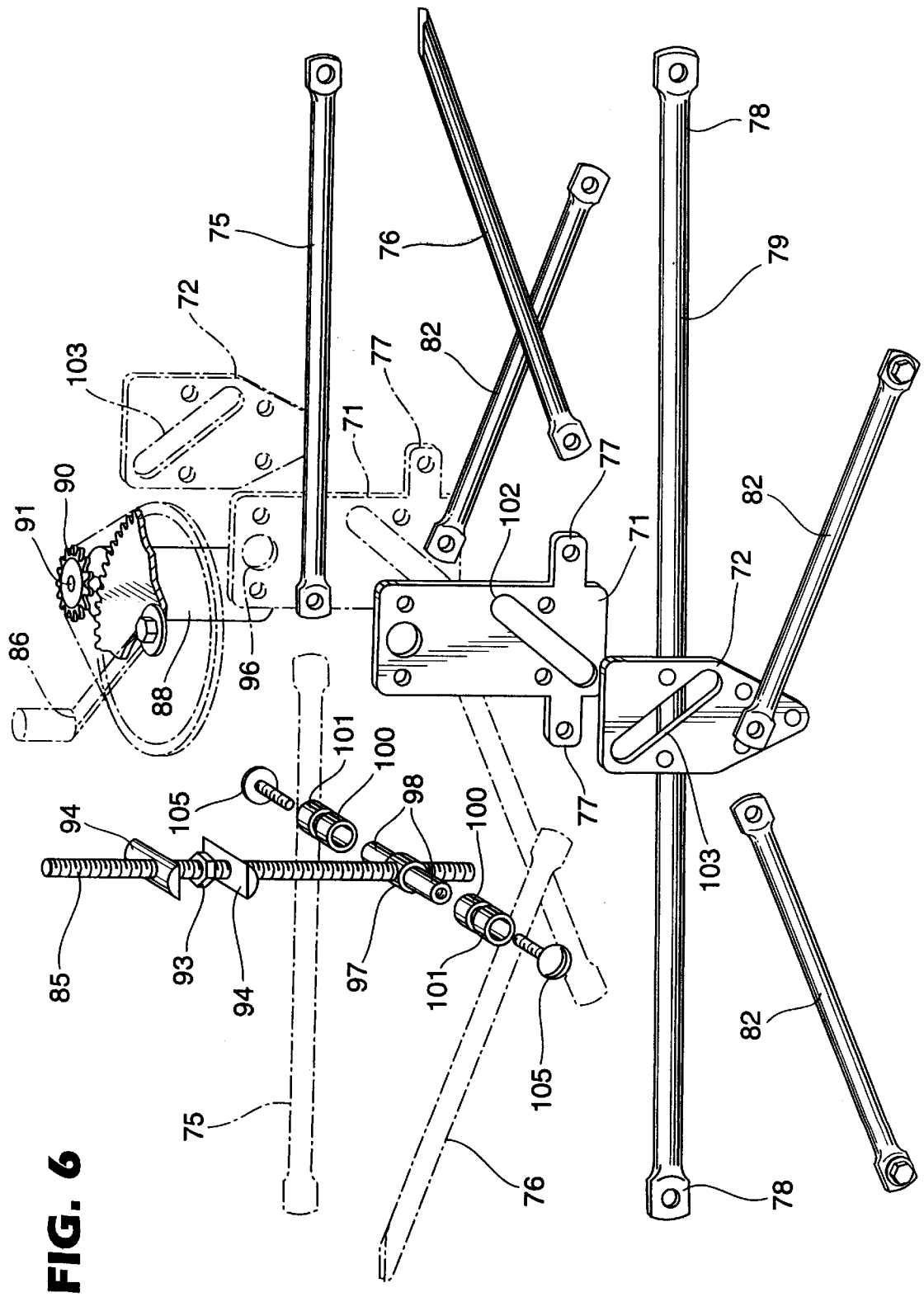
FIG. 6 is an exploded isometric view of the levelling mechanism of FIG. 5.

Referring to FIGS. 5 and 6, one embodiment of the leveling assembly 68 includes a central cam assembly 69 defined by a pair of rectangular upper cam plates 71 sandwiched between pentagonal lower cam plates 72. The top ends of the upper cam plates 71 are pivotally connected to the top ends of the back post 73 of the rear frame section 13 by upper struts 75. Upper diagonal braces 76 extend from the outer ends of the struts 75 to arms 77 extending outwardly from the bottom ends of the upper cam plates 71. The top, outer ends of the braces 76 are fixedly connected to the struts 75, and the bottom, inner ends of the braces are fixedly connected to the arms 77.

The flattened ends 78 of a bottom strut 79 are pivotally connected to the bottom ends of the rear frame posts 73. A pair of horizontal struts 80 are fixedly connected to the bottom strut 79 on either side of the center thereof, and pivotally connected to the bottom bar 58 of the rear frame section 13 (FIG. 2). The bottom ends of the lower cam plates 72 are fixedly connected to the middle of the bottom strut 79. The ends of lower diagonal braces 82 are fixedly connected to the lower cam plates 72 above the center thereof by bolts 83. A pair of bolts 84 extend through both cam plates 72 with spacers (not shown) therebetween to maintain the plates 72 in position. A threaded rod 85 extends downwardly between the upper and lower cam plates 71 and 72, respectively at the longitudinal centers thereof. The rod 85 is manually rotated by a handle 86 on the top end thereof. Alternatively, a sprocket 87 on the top end of the rod 85 beneath the handle 86 is rotated by an electric motor 88. The motor is mounted in brackets (not shown) on the rear end of the cam plates 71 and 72. The motor 88 used in the prototype is a reversible, cordless, electric screw driver. However, any suitable reversible electric motor can be used. The motor is connected to a switch (not shown) on the handlebars 40 to facilitate operator actuation of the motor. The handle 86 on the top end of the rod 85 is a backup in case the batteries used to power the motor loose their charge while the apparatus is on the road. A small sprocket 90 of the shaft 91 of the motor 88 is connected to the sprocket 87 on the rod 85 for driving the latter.

A nut 93 (FIG. 6) defining thrust bearing is mounted on the rod 85 between the upper cam plates 71. The nut 93 is retained in position by semicylindrical keepers 94 extending into aligned holes 96 near the top ends of the upper cam plates 71. An actuator pin 97 is threaded onto on the bottom end of the rod 85. Each narrow diameter end 98 of the pin 97 extends outwardly through a pair of rollers 100 and 101 in inclined slots 102 and 103, respectively in the bottom ends of the upper cam plates 71 and in the top ends of the lower cam plates 72, respectively. Screws 105 with large heads extend into the pin 97 to tie the cam plates 71 and 72 together.

When the rod 85 is rotated, the pin 97 is caused to move vertically therealong. The rollers 100 and 101 move in the slots 102 and 103. Because the slots 102 and 103 are inclined in opposite directions, the top and bottom plates are caused to pivot relative to each other, and consequently the top and bottom ends of the levelling assembly move in opposite directions to cant the bicycles.

Figure 7:
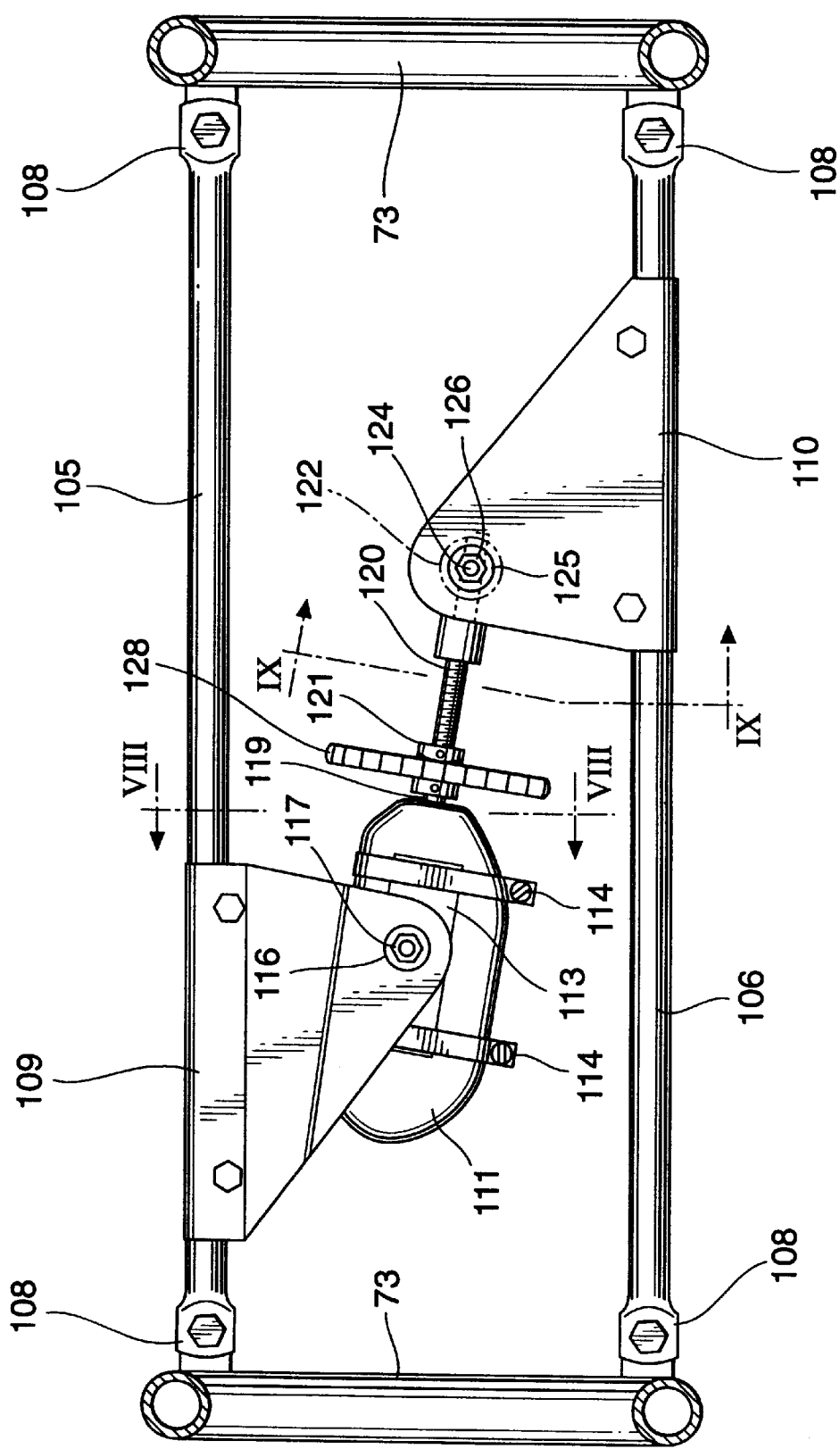
FIG. 7 is a front view of an alternate form of a levelling mechanism for use in the apparatus of FIGS. 1 to 3.
Figure 8:
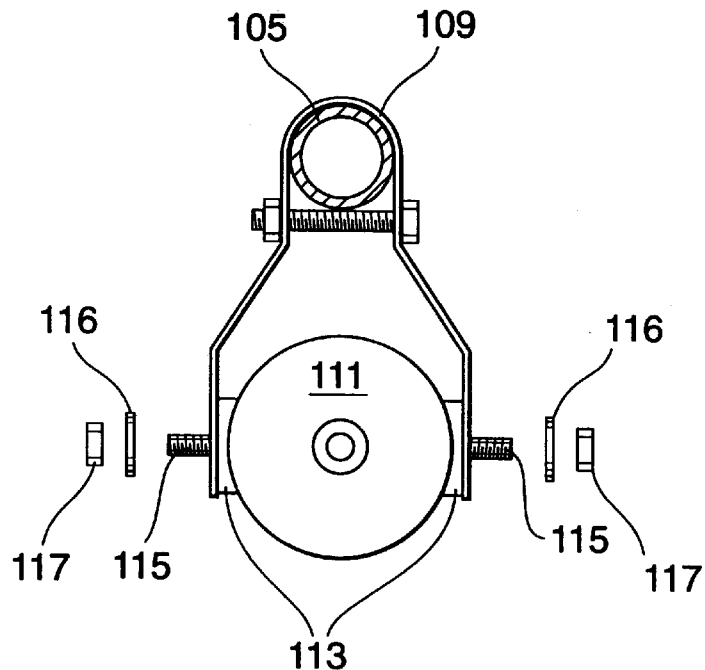
FIG. 8 is a cross section taken generally along line VIII—VIII of FIG. 7.
Figure 9:
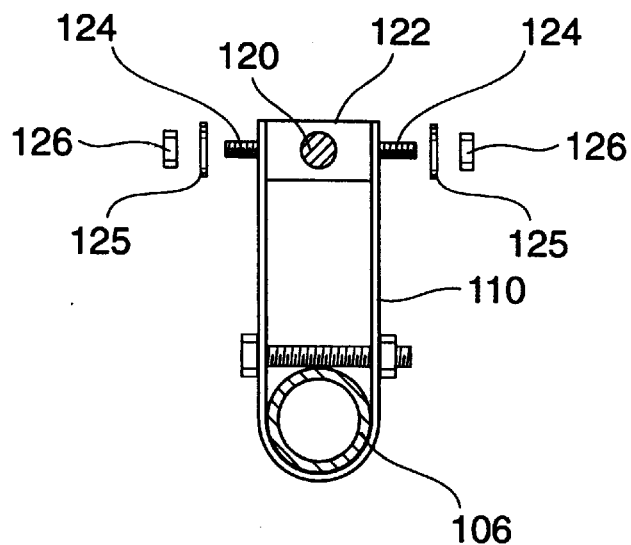
FIG. 9 is a cross section taken generally along line IX—IX of FIG. 7.

As shown in FIGS. 7 to 9, a second, simpler embodiment of the levelling assembly includes top and bottom one-piece struts 105 and 106, respectively the flattened ends 108 of which are pivotally connected to the back posts 73 of the rear frame section 13. Opposed generally triangular brackets 109 and 110 are mounted on opposite ends of the struts 105 and 106. A reversible motor 111 is pivotally mounted on the bottom end of the upper bracket 109 using side plates 113 and hose clamps 114. Because the shaft of the motor 111 is subjected to longitudinal push and pull forces, the motor should include a thrust bearing. The hose clamps 114 retain the plates 113 on the motor 111. A bolt 115 extends outwardly from one end of each side plate 113 through holes in the sides of the bracket 109, and a washer 116 and a nut 117 are provided on the bolt 115. A shaft 119 extending out of the bottom, inner end of the motor 111 is connected to one end of a threaded rod or screw 120 by a coupler 121. The other end of the screw 120 is connected to a cylindrical actuator nut 122 extending between the sides of the bracket 110. Bolts 124 extend outwardly from the nut 122 through the sides of the bracket 110, and washers 125 and nuts 126 are provided on the outer ends of the bolts 124.

When the motor 111 is actuated, the brackets 109 and 110 and consequently the struts 105 and 106 are caused to move longitudinally in opposite directions to each other. Thus, the bicycles 1 are caused to tilt or cant, the direction of tilt being determined by the direction of rotation of the motor 111. A wheel 128 permitting manual rotation of the screw 120 is mounted on the coupler 121. Should the motor 111 be inoperable, the wheel 128 can be used to cant the bicycles.

It will be appreciated that the use of a frame with a low rear section makes it easy to mount or dismount, and results in a low center of gravity for the apparatus. The use of a positive trim or levelling device makes it possible to use lightweight materials, e.g. aluminum or steel, in the frames of the bicycles. Without a levelling system, it would be necessary to use stronger, heavier materials in the bicycle frames. Finally, one bicycle can be separated from the other bicycle and used alone. The low seat position is well suited to the human form, placing less stress on the wrists and hands than conventional bicycles, and providing back support and better leverage for leg work.

What is claimed is:

1. A bicycle apparatus comprising first and second identical bicycles, each said bicycle including skeletal frame means, said frame means including a front frame section supporting a front wheel and a pedal system, and a rear frame section integral with said front frame section supporting chair means and a rear wheel, said rear wheel being located rearwardly of said rear frame section, the top of said rear frame section being substantially the same height as the top of said pedal system to facilitate mounting and dismounting of the apparatus; steering means on said front frame section of each said bicycle including handlebar means connected to the front wheel for steering the apparatus; linkage means interconnecting the steering means on the front frame section of said first bicycle to the steering means on said second bicycle, whereby the apparatus can be steered by either one of a pair of drivers; and leveling means beneath said chair means interconnecting the rear frame sections of said first and second bicycles for canting the bicycles in unison, said leveling means including upper and lower rear strut means extending between and pivotally interconnecting the rear frame sections of said bicycles; and diagonal actuator means extending between and pivotally connected to said upper and lower strut means for moving said upper and lower strut means longitudinally in opposite directions, whereby the bicycles can ben canted in unison.

2. The bicycle apparatus of claim 1, wherein said steering means includes front shaft means in each said front frame section carrying the front wheel of each said bicycle; rear shaft means rotatable in each said front frame section carrying said handlebar means; first yoke means on a top end of each said front shaft means for rotation with said front shaft means; second yoke means on each said rear shaft means beneath said handlebar means for rotation with said rear shaft means; arm means connecting each said first and second yoke means whereby turning of said handlebar means results in corresponding turning of said front wheel; tie bar means connecting said first yoke means of one bicycle to the first yoke means of the other bicycle; and front strut means beneath said tie bar means pivotally interconnecting the front frame sections of the bicycles.

3. The bicycle apparatus of claim 1, wherein said actuator means includes drive means inclined with respect to and extending between said upper and lower strut means for moving said upper and lower strut means in opposite directions.

4. The bicycle apparatus of claim 3, wherein said drive means includes motor means pivotally mounted on one end of one said upper and lower strut means for rotating a screw means; screw means for rotation by said motor means; and nut means pivotally mounted on the other said upper and lower strut means for receiving said screw means, actuation of said motor means causing movement of said screw means in said nut means to move opposite ends of said upper and lower strut means in opposite directions.

5. The bicycle apparatus of claim 1, wherein said actuator means includes cam means between said upper and lower strut means for pivotally interconnecting said upper and lower strut means; and drive means for rotating said cam means to cause said upper and lower strut means to move in opposite directions.

6. The bicycle apparatus of claim 5, wherein said cam means includes upper cam plate means connected to said upper strut means for movement with said upper strut means, lower cam plate means connected to said lower strut means for movement with said lower strut means; diagonal slot means for receiving an actuator pin in said upper and lower cam plate means, said slot means being inclined in opposite directions; actuator pin means for sliding in said slot means, said slot means and said pin means permitting relative of said upper and lower cam plate means in opposite directions, said drive means moving said actuator pin means in said slot means, whereby said upper and lower cam plate means are caused to rotate in opposite directions to move said upper and lower strut means in such opposite directions.

7. The bicycle apparatus of claim 6, wherein said drive means includes threaded rod means engaging said actuator pin means for moving the actuator pin means in said diagonal slot means; and reversible motor means for rotating said rod means, whereby said upper and lower cam plate means are caused to rotate in opposite directions.

8. The bicycle apparatus according to claim 1, including carriage means slidable on said rear frame for section carrying said chair means; and adjustment means on said rear frame section for causing said carriage means to slide on said rear frame section to vary the location of said chair means relative to said handlebar means.

9. The bicycle apparatus of claim 8, wherein said chair means includes padded seat means; and straight back means for supporting the back of a driver.

10. The bicycle apparatus of claim 6, wherein said actuator means includes upper diagonal brace means extending between outer ends of said upper strut means and bottom ends of said upper cam plate means for causing said upper strut means to move in one direction when said upper cam plate is rotated; and lower diagonal brace means extending between outer ends of said lower strut means and upper ends of said lower cam plate means for causing said lower strut means to move in an opposite direction when said lower cam plate means is rotated.

11. The bicycle apparatus of claim 10, wherein said actuator means includes horizontal strut means extending between said lower strut means on either side of said lower cam plate means and the bottom of said rear frame sections of said first and second bicycles for pivotally interconnecting the bottom of said rear frame sections to said lower strut means.

* * * * *